(12) United States Patent
Uskoreit

(10) Patent No.: US 9,400,630 B2
(45) Date of Patent: Jul. 26, 2016

(54) SYSTEMS AND METHODS FOR ENHANCED SPEECH RECOGNITION INTERFACE ON MOBILE DEVICE

(71) Applicant: Google Inc., Mountain View, CA (US)

(72) Inventor: Jakob David Uskoreit, San Francisco, CA (US)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 14/137,427

(22) Filed: Dec. 20, 2013

(65) Prior Publication Data

US 2015/0178041 A1    Jun. 25, 2015

(51) Int. Cl.
| | |
|---|---|
| *G10L 15/26* | (2006.01) |
| *G06F 3/16* | (2006.01) |
| *G10L 15/22* | (2006.01) |
| *G06F 3/0481* | (2013.01) |
| *G10L 15/30* | (2013.01) |
| *G06F 3/0488* | (2013.01) |

(52) U.S. Cl.
CPC ................ *G06F 3/165* (2013.01); *G10L 15/22* (2013.01); *G06F 3/04817* (2013.01); *G06F 3/04886* (2013.01); *G10L 15/30* (2013.01)

(58) Field of Classification Search
CPC ....... G10L 19/008; G10L 19/22; G10L 19/24; G10L 15/00; G10L 19/00; G10L 19/167; G10L 19/173; G10L 2015/025; G10L 2021/02166; G10L 21/0208; G10L 15/08; G10L 15/1815; G10L 15/19; G10L 15/265; G10L 19/018; G10L 17/00; G10L 17/005; G10L 15/26; G07F 17/26; G07F 7/086; G07F 7/1008; G07F 17/32; G07F 17/323; G07F 17/3237

USPC ............ 704/1–10, 235, 270, 270.1, 200, 272, 704/233

See application file for complete search history.

(56) References Cited

U.S. PATENT DOCUMENTS

| | | | |
|---|---|---|---|
| 8,134,362 B1 * | 3/2012 | Hullender | G08G 5/0026 324/300 |
| 2011/0038594 A1 * | 2/2011 | Symons | G11B 20/00086 386/224 |

* cited by examiner

*Primary Examiner* — Huyen Vo
(74) *Attorney, Agent, or Firm* — Troutman Sanders LLP; James E. Schutz; Christopher W. Glass

(57) ABSTRACT

Certain implementations of the disclosed technology include systems and methods for an enhanced speech recognition interface. According to an example implementation, a method includes outputting a first icon and second icon for presentation on a display device; responsive to receiving an indication of an input object being maintained at a first location of an input device, causing a recording device to record an audio signal; responsive to receiving an indication that the input object has moved across the input device from the first location of the input device to a second location of the input device, causing the recording device to stop recording the audio signal; outputting text, based on the recorded audio signal, for presentation on the display device; and responsive to receiving an indication of the input object being maintained at the second location of the input device, causing a portion of the text to be removed from presentation on the display device.

33 Claims, 3 Drawing Sheets

SYSTEMS AND METHODS FOR ENHANCED SPEECH RECOGNITION INTERFACE ON MOBILE DEVICE

BACKGROUND

Computing devices may utilize a dedicated user interface for speech recognition functions such as converting speech into text. Speech recognition mistakes can interrupt continuity of the dictation process, a problem that may be particularly frustrating to a user of a mobile device with limited input controls. Conventional systems may fail to provide an intuitive and efficient interface for speech recognition functionality on a mobile device. Accordingly, among other needs, there is an existing need for a speech recognition interface that is powerful yet efficient and easy to use.

SUMMARY

Some or all of the above needs may be addressed by certain implementations of the disclosed technology. Certain implementations provide an enhanced user interface for speech recognition functions on a computing device. In an example implementation, a method is provided, which includes outputting, by a computing device, a first icon for presentation at a first location of a display device, and outputting, by the computing device, a second icon for presentation at a second location of the display device. The method also includes, responsive to receiving, at the computing device, an indication of an input object being maintained, for at least a threshold amount of time, at a first location of an input device that is operatively coupled to the computing device, causing, by the computing device, a recording device to record an audio signal. The first location of the input device is associated with the first location of the display device. The method also includes, responsive to receiving, at the computing device, an indication that the input object has moved across the input device from the first location of the input device to a second location of the input device, causing, by the computing device, the recording device to stop recording the audio signal. The second location of the input device is associated with the second location of the display device. The method also includes outputting, by the computing device, text for presentation on the display device, the text being based on the recorded audio signal, and, responsive to receiving, at the computing device, an indication of the input object being maintained, for at least a threshold amount of time, at the second location of the input device, causing, by the computing device, a portion of the text to be removed from presentation on the display device.

In another example implementation of the disclosed technology, a system is provided. The system includes an input device and one or more processors that are in communication with the input device and a display device. The system also includes a memory in communication with the one or more processors. The memory stores instructions that, when executed by the one or more processors, cause the system to perform specific functions. The functions include outputting a first icon for presentation at a first location of a display device, and outputting a second icon for presentation at a second location of the display device. The functions also include, responsive to receiving an indication of an input object being maintained, for at least a threshold amount of time, at a first location of an input device that is operatively coupled to the computing device, causing a recording device to record an audio signal. The first location of the input device is associated with the first location of the display device. The functions also include, responsive to receiving an indication that the input object has moved across the input device from the first location of the input device to a second location of the input device, causing the recording device to stop recording the audio signal. The second location of the input device is associated with the second location of the display device. The functions also include outputting text that is based on the recorded audio signal for presentation on the display device. The functions also include, responsive to receiving an indication of the input object being maintained, for at least a threshold amount of time, at the second location of the input device, causing a portion of the text to be removed from presentation on the display device. The second location of the input device is associated with the second location of the display device.

In another example implementation of the disclosed technology, a non-transitory computer-readable medium is provided that stores instructions that, when executed by at least one processor in a system, cause the system to perform a method. The method includes outputting a first icon for presentation at a first location of a display device, and outputting a second icon for presentation at a second location of the display device. The method also includes, responsive to receiving an indication of an input object being maintained, for at least a threshold amount of time, at a first location of an input device that is operatively coupled to the computing device, causing a recording device to record an audio signal. The first location of the input device is associated with the first location of the display device. The method also includes, responsive to receiving an indication that the input object has moved across the input device from the first location of the input device to a second location of the input device, causing the recording device to stop recording the audio signal. The second location of the input device is associated with the second location of the display device. The method also includes outputting, for presentation on the display device, text that is based on the recorded audio signal and, responsive to receiving an indication of the input object being maintained, for at least a threshold amount of time, at the second location of the input device, causing a portion of the text to be removed from presentation on the display device.

Other implementations, features, and aspects of the disclosed technology are described in detail herein and are considered a part of the claimed disclosed technology, and can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
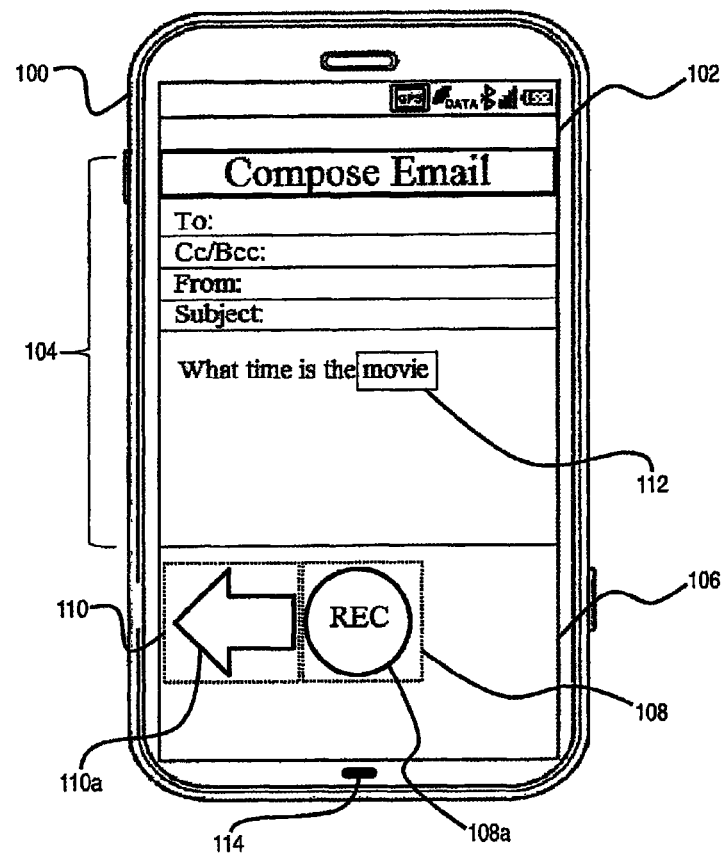
FIG. 1 is an illustration of a mobile device 100, according to an example implementation.

Some implementations of the disclosed technology will be described more fully hereinafter with reference to the accompanying drawings. This disclosed technology may, however, be embodied in many different forms and should not be construed as limited to the implementations set forth herein.

The disclosed technology includes systems and methods for enhanced speech recognition interfaces. Certain implementations provide an enhanced interface that allows a user of a computing device to correct speech recognition mistakes without interrupting the flow of dictation. In an example implementation, the computing device outputs a first icon for presentation at a first location of a display device that is operatively coupled to or included in the computing device. The computing device can then enter a dictation mode in response to receiving an indication that an input gesture is being entered at a first location of an input device. The first location of the input device may correspond to the first location of the display device. The input device may be a presence-sensitive input device, such as a touchscreen, that is operatively coupled to or included in the computing device. The input gesture may include one or more of a touch gesture, hold gesture, slide gesture, or swipe gesture from an input object such as a stylus or finger. For instance, the user may enter a hold gesture by placing and maintaining an input object at the first location of the input device. While in the dictation mode, a recording device can record speech from the user as audio signals. The recording device may be a microphone that is operatively coupled to or included in the computing device. The recorded audio signals can be converted into text and then output for presentation on the display device. The computing device may use local and/or cloud-based speech-to-text processing to convert the audio signals into text. In some implementations, the computing device can cause the recording device to stop recording audio signals in response to receiving an indication that the input object is being moved, or has been moved, away from the first location of the input device.

In an example implementation, the computing device also outputs a second icon for presentation at a second location of the display device. The computing device enters a correction mode, after causing the recording device to stop recording the audio signal, and in response to receiving an indication that the input object has moved away from the first location of the input device to a second location of the input device. The second location of the input device may correspond to the second location of the display device. The input object being moved away from the first location to the second location may involve a slide gesture being entered by the input object, from the first location of the input device to the second location of the input device.

As an example, the last word or phrase of the converted text may be misspelled or contain grammatical mistakes as a result of a speech recognition error. In the correction mode, a user may correct such mistakes by interacting with an input device such as an on-screen keyboard, to enter corrective text or to delete the last word or phrase such that the computing device removes the last word or phrase from presentation on the display device. The computing device may then output the text for presentation on the display device such that the last word or phrase of the text to be removed from presentation is visually emphasized. For example, the last word may be highlighted, displayed in bold font, or displayed within a border such as an outlined text box. In an example implementation, when speech is recorded in a dictation mode, the computing device detects that the user has entered a slide gesture by moving an input object across the input device from the location associated with the first icon to the location associated with the second icon and then back to the location associated with the first icon. In response, the computing device can stop the recording mode, remove the last word or phrase of the text from presentation on the display device, and then resume the recording mode, respectively.

In one example implementation, the computing device continues, without interruption, to remove portions of the text from presentation on the display device while an input object is maintained, such as by a hold gesture, at the second location of the input device and until the input object is removed from the second location of the input device. The text may be removed in a successive, sequential fashion beginning with the last words or phrases in the text, i.e. the newest portions, and progressing towards the earliest portions. When the input object is removed from the second location of the input device, for example when a user slides the input object away from the second location of the input device to a different location, the correction mode terminates.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

FIG. 1 is an illustration of a mobile computing device 100 according to an example implementation of the disclosed technology. As shown, a speech recognition interface 106 is displayed on a presence-sensitive display 102 of the computing device 100. The speech recognition interface 106 includes a recording icon 108a ("REC") displayed at a first location 108 on the display 102 and a delete icon 110a (depicted as an arrow) displayed at a second location 110 on the display 102. As depicted by visual elements 104, the computing device 100 is running a speech recognition application for recording spoken words and converting the recorded words into text, and in particular an e-mail dictation application. In the example implementation shown, the computing device 100 has detected an input gesture entered at the first location 106, and, in response, has received audio signals associated with spoken words recorded by a recording device. The recording device may include the microphone 114 of the mobile device 110. The computing device can convert the audio signals into text for display on the display 102.

In this example implementation, the user has entered a hold gesture at the first location 108 by placing his/her finger (or another type of input object, for example a stylus) on the display 102 at the first location 108, which corresponds to the displayed recording icon 108a. While holding his/her finger at the first location 108, the user spoke the words: "What time is the play." The speech recognition application, however, incorrectly interpreted the spoken word "play" to be the word "movie." As a result, the converted text reads: "What time is the movie." The word "movie", as displayed, is visually emphasized with a border 110 to indicate that this word will be deleted if the user enters an input gesture at the second location 110, which corresponds to the delete icon 110a. In response to receiving an indication that the user entered a second input gesture at the second location 110, the computing device 100 causes the word "movie" to be deleted from the displayed text. To enter the input gesture at the second location 110, the user may slide his/her finger from the first location 108 to the second location 110 and then maintain his/her finger at the second location 110. Once the word "movie" is deleted, the user may resume dictation by moving his/her finger back to the first location 108, for example by sliding his/her finger from the second location 110 to the first location 108. In the example implementation shown in FIG. 1, the recording icon 108a is displayed immediately adjacent the delete icon 110a to allow the user to easily shift between dictation and correction modes without having to navigate over or across intermediate locations on the display 102 that may be associated with unrelated functions.

Figure 2:
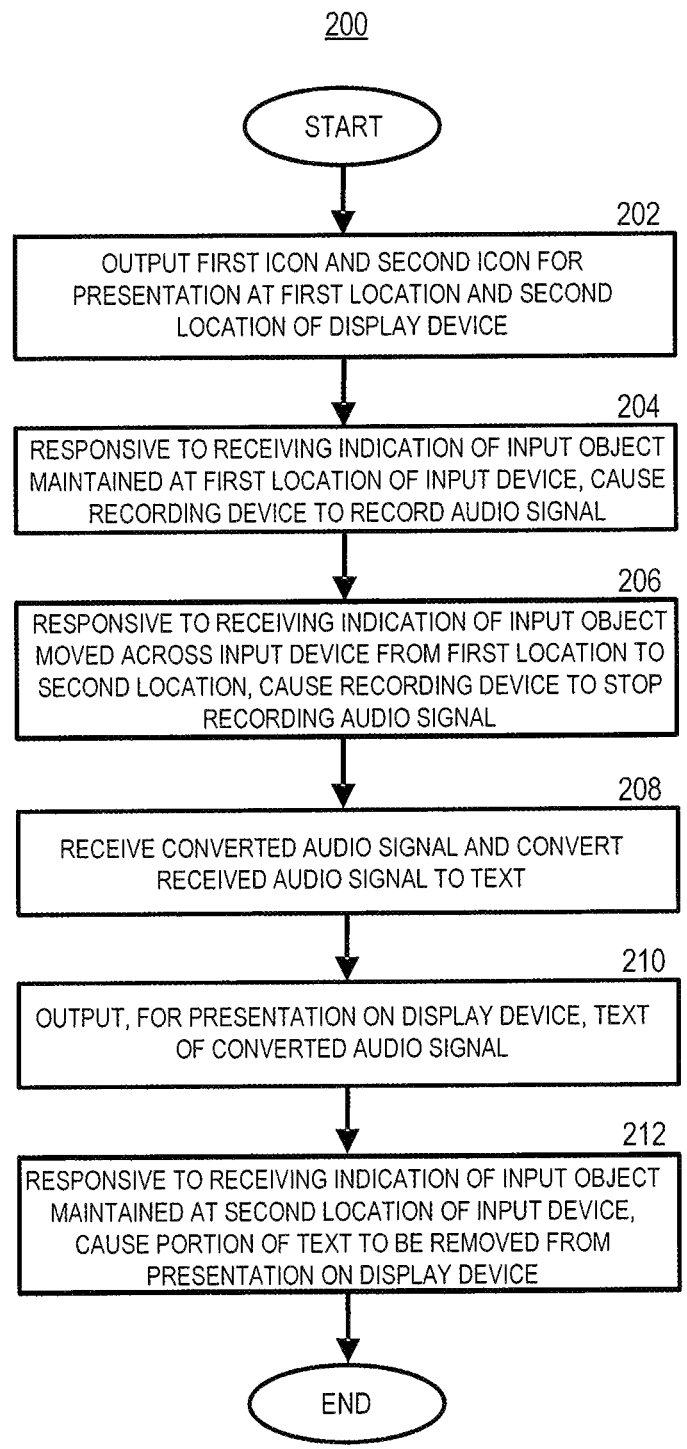
FIG. 2 is flow diagram of a method 200 according to an example implementation.

FIG. 2 is flow diagram of a method 200 according to an example implementation. The method 200 begins at block 202, where a computing device, such as the mobile computing device 100 shown in FIG. 1, outputs a first icon for presentation on a display at a first location of the display device, and outputs a second icon for presentation at a second location of the display device. At block 204, in response to receiving an indication that an input object is being maintained at a first location of an input device for at least a threshold amount of time, the computing device causes a recording device to record an audio signal. The input device may be a presence-sensitive input device configured to detect input gestures entered by an input object, for example touch gestures, hold gestures, and/or slide gestures. At block 206, in response to receiving an indication that the input object has moved across the input device from the first location of the input device to a second location of the input device that is associated with the second location of the display device, the computing device causes the recording device to stop recording the audio signal.

At block 208, the computing device receives the recorded audio signal from the recording device and converts the audio signal into text. Converting the received audio signal into text may include sending all of or a portion of the received audio signal through a distributed network for processing and receiving the text of the converted audio signal from the distributed network. At block 210, the computing device outputs the text for presentation on the display device. At block 212, in response to receiving an indication that the input object is being maintained at the second location of the input device for at least a threshold amount of time, the computing device causes at least one portion of the text to be removed from presentation on the display device. The second location of the input device may correspond to the second location of the display device. A portion of the text to be removed from presentation may correspond to the last word or phrase of the text converted from the audio signal. The computing device may output the text converted from the audio signal such that, as displayed, the portion of the text to be removed from presentation is visually emphasized. The method 200 ends following block 212.

Figure 3:
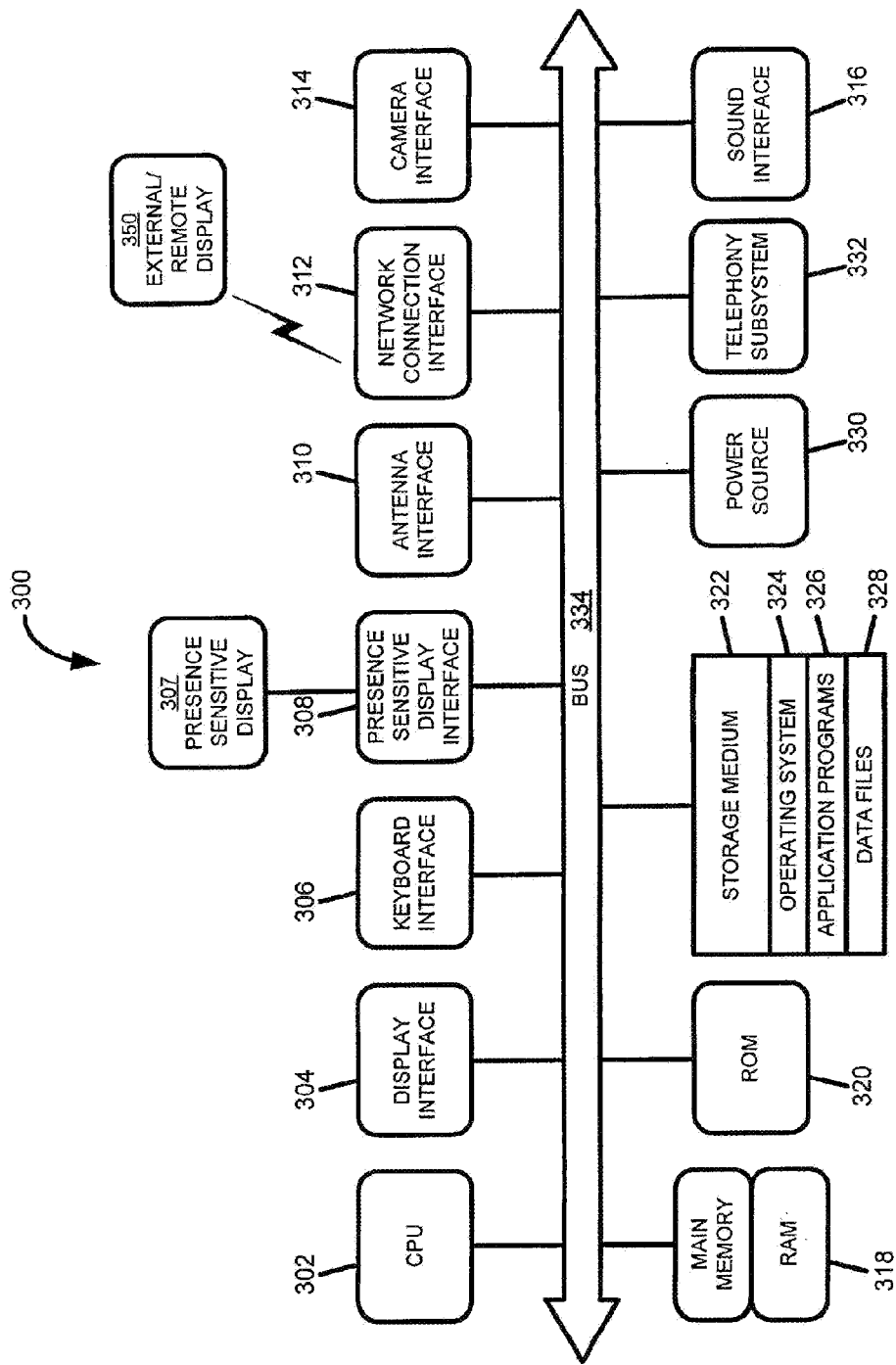
FIG. 3 is a block diagram of an illustrative mobile device computing system architecture 300, according to an example implementation.

FIG. 3 depicts a block diagram of an illustrative computer system architecture 300 according to an example implementation. Certain aspects of FIG. 3 may be embodied in a computing device, for example the mobile computing device 100 as shown in FIG. 1. Certain implementations of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

Various implementations and methods herein may be embodied in non-transitory computer readable media for execution by a processor. It will be understood that the architecture 300 is provided for example purposes only and does not limit the scope of the various implementations of the communication systems and methods.

The architecture 300 includes one or more processors where computer instructions are processed, which may comprise the processor 302 and may be combined with one or more additional components shown in FIG. 3. For example, in one example embodiment, the architecture 300 may correspond to a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

The architecture includes a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile device. In another example implementation, the display interface 304 may be configured for providing data, images, and other information for an external/remote display 350 that is not necessarily connected to the mobile computing device. For example, a desktop monitor may be utilized for mirroring graphics and other information that is presented on a mobile device. In certain example implementations, the display interface 304 may wirelessly communicate, for example, via a Wi-Fi channel or other available network connection interface 322 to the external/remote display 350.

In an example implementation, the network connection interface 322 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 304 may be operatively coupled to a local display, such as a touch-screen display associated with a mobile device. In another example, the display interface 304 may be configured to provide video, graphics, images, text, other information, or any combination thereof for an external/remote display 350 that is not necessarily connected to the mobile computing device. In one example, a desktop monitor may be utilized for mirroring or extending graphical information that may be presented on a mobile device. In another example, the display interface 304 may wirelessly communicate, for example, via the network connection interface 322 such as a Wi-Fi transceiver to the external/remote display 350.

The architecture 300 may include a keyboard interface 306 that provides a communication interface to a keyboard. In one example implementation, the architecture 300 may include a presence-sensitive display interface 308 for connecting to a presence-sensitive display 307. According to certain example implementations of the disclosed technology, the presence-sensitive display interface 308 may provide a communication interface to various devices such as a pointing device, a touch screen, a depth camera, etc. which may or may not be associated with a display. Example implementations of the architecture 300 may include an antenna interface 320 that provides a communication interface to an antenna, and a network connection interface 322 that provides a communication interface to a network. As mentioned above, the display interface 304 may be in communication with the network connection interface 322, for example, to provide information for display on a remote display that is not directly connected or attached to the system. In certain implementations, a camera interface 324 is provided that acts as a communication interface and provides functions for capturing digital images from a camera. In certain implementations, a sound interface 326 is provided as a communication interface for converting sound into electrical signals using a microphone and for converting electrical signals into sound using a speaker. According to example implementations, a random access memory (RAM) 328 is provided, where computer instructions and data may be stored in a volatile memory device for processing by the CPU 302.

According to an example implementation, the architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the architecture 300 includes a power source 320 that provides an appropriate alternating current (AC) or direct current (DC) to power components. According to an example implementation, the architecture 300 includes a telephony subsystem 322 that allows the device 300 to transmit and receive sound over a telephone network. The constituent devices and the CPU 302 communicate with each other over a bus 324.

In accordance with an example implementation, the CPU 302 has appropriate structure to be a computer processor. In one arrangement, the computer CPU 302 may include more than one processing unit. The RAM 328 interfaces with the computer bus 324 to provide quick RAM storage to the CPU 302 during the execution of software programs such as the operating system application programs, and device drivers. More specifically, the CPU 302 loads computer-executable process steps from the storage medium 322 or other media into a field of the RAM 328 in order to execute software programs. Data may be stored in the RAM 328, where the data may be accessed by the computer CPU 302 during execution. In one example configuration, the device 300 includes at least 228 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the term computing device, as used herein, may be a CPU, or conceptualized as a CPU (for example, the CPU 302 of FIG. 3). In this example implementation, the computing device (CPU) may be coupled, connected, and/or in communication with one or more peripheral devices, such as a display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

Certain embodiments of the disclosed technology are described above with reference to block and flow diagrams of systems and methods and/or computer program products according to various embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   outputting, by a computing device, a first icon for presentation at a first location of a display device;
   outputting, by the computing device, a second icon for presentation at a second location of the display device;
   responsive to receiving, at the computing device, an indication of an input object being maintained, for at least a threshold amount of time, at a first location of an input device that is associated with the first location of the display device, causing, by the computing device, a recording device to record an audio signal;
   responsive to receiving, at the computing device, an indication that the input object has moved across the input device from the first location of the input device to a second location of the input device that is associated with the second location of the display device, causing, by the computing device, the recording device to stop recording the audio signal;
   outputting, by the computing device, text for presentation on the display device, the text being based on the recorded audio signal;
   responsive to receiving, at the computing device, an indication of the input object being maintained, for at least a threshold amount of time, at the second location of the input device, causing, by the computing device, a portion of the text to be removed from presentation on the display device.

2. The method of claim 1, wherein causing the portion of the text to be removed from presentation on the display device comprises causing, by the computing device, successive portions of the text to be removed from presentation on the display device until an indication is received, at the computing device, that the input object has moved from the second location of the input device to another location of the input device.

3. The method of claim 2, wherein the indication that the input object has moved to another location of the input device includes an indication that the input object has moved across the input device from the second location of the input device to the first location of the input device.

4. The method of claim 3, further comprising:
   responsive to receiving the indication that the input object has moved across the input device from the second location of the input device to the first location of the input device, causing the recording device to resume recording the audio signal.

5. The method of claim 3, wherein the indication that the input object has moved across the input device from the second location of the input device to the first location of the input device includes an indication of a slide gesture, entered by the input object, from the second location of the input device to the first location of the input device.

6. The method of claim 1, wherein the indication of the input object being maintained at the first location of the input device includes an indication of a hold gesture, entered by the input object, at the first location of the input device.

7. The method of claim 1, wherein the indication that the input object has moved across the input device from the first location of the input device to the second location of the input device includes an indication of a slide gesture, entered by the input object, from the first location of the input device to the second location of the input device.

8. The method of claim 1, wherein the first icon and second icon are output, by the computing device, for presentation on the display device such that the first icon is displayed immediately adjacent to the second icon.

9. The method of claim 1, wherein the portion of the text to be removed from presentation on the display device is output, by the computing device, for presentation on the display device such that, as displayed, the portion of the text to be removed from presentation on the display device is visually emphasized.

10. The method of claim 1, wherein the input device is a presence-sensitive input device.

11. The method of claim 1, wherein the text that is based on the recorded audio signal and output for presentation on the display device is determined by:
    sending, by the computing device, to a remote device, at least a portion of the recorded audio signal; and
    receiving, at the computing device, from the remote device, the text from the text based on the recorded audio signal.

12. A system, comprising:
    an input device;
    one or more processors in communication with the input device and a display device; and
    a memory in communication with the one or more processors and storing instructions that, when executed by the one or more processors, cause the system to:
       output, for presentation at a first location of the display device, a first icon;
       output, for presentation at a second location of the display device, a second icon;
       responsive to receiving, at the computing device, an indication of an input object being maintained, for a threshold amount of time, at a first location of the input device that is associated with the first location of the display device, cause a recording device to record an audio signal;
       responsive to receiving an indication that the input object has moved across the input device from the first location of the input device to a second location of the input device that is associated with the second location of the display device, cause the recording device to stop recording the audio signal;

output text for presentation on the display device, the text being based on the recorded audio signal; and responsive to receiving an indication of the input object being maintained, for at least a threshold amount of time, at the second location of the input device, cause a portion of the text to be removed from presentation on the display device.

13. The system of claim 12, wherein causing the portion of the text to be removed from presentation on the display device comprises causing successive portions of the text to be removed from presentation on the display device until an indication is received that the input object has moved from the second location of the input device to another location of the input device.

14. The system of claim 13, wherein the indication that the input object has moved to another location of the input device includes an indication that the input object has moved across the input device from the second location of the input device to the first location of the input device.

15. The system of claim 14, further comprising:

responsive to receiving the indication that the input object has moved across the input device from the second location of the input device to the first location of the input device, causing the recording device to resume recording the audio signal.

16. The system of claim 14, wherein the indication that the input object has moved across the input device from the second location of the input device to the first location of the input device includes an indication of a slide gesture, entered by the input object, from the second location of the input device to the first location of the input device.

17. The system of claim 12, wherein the indication of the input object being maintained at the first location of the input device includes an indication of a hold gesture, entered by the input object, at the first location of the input device.

18. The system of claim 12, wherein the indication that the input object has moved across the input device from the first location of the input device to the second location of the input device includes an indication of a slide gesture, entered by the input object, from the first location of the input device to the second location of the input device.

19. The system of claim 12, wherein the first icon and second icon are output for presentation on the display device such that the first icon is displayed immediately adjacent to the second icon.

20. The system of claim 12, wherein the portion of the text to be removed from presentation on the display device is output for presentation on the display device such that, as displayed, the portion of the text to be removed from presentation on the display device is visually emphasized.

21. The system of claim 12, wherein the input device is a presence-sensitive input device.

22. The system of claim 12, wherein the text that is based on the recorded audio signal and output for presentation on the display device is determined by:

sending, to a remote device, at least a portion of the recorded audio signal; and receiving, from the remote device, the text from the text based on the recorded audio signal.

23. A non-transitory computer-readable medium storing instructions that, when executed by one or more processors, cause a computing device to perform a method including:

outputting a first icon for presentation at a first location of a display device;

outputting a second icon for presentation at a second location of the display device;

responsive to receiving an indication of an input object being maintained, for at least a threshold amount of time, at a first location of an input device operatively coupled to the computing device, the first location of the input device being associated with the first location of the display device, causing a recording device to record an audio signal;

responsive to receiving an indication that the input object has moved across the input device from the first location of the input device to a second location of the input device that is associated with the second location of the display device, causing the recording device to stop recording the audio signal;

outputting, by the computing device, text for presentation on the display device, the text being based on the recorded audio signal;

responsive to receiving, at the computing device, an indication of the input object being maintained, for at least a threshold amount of time, at the second location of the input device, causing, by the computing device, a portion of the text to be removed from presentation on the display device.

24. The computer-readable medium of claim 23, wherein causing the portion of the text to be removed from presentation on the display device comprises causing, by the computing device, successive portions of the text to be removed from presentation on the display device until an indication is received, at the computing device, that the input object has moved from the second location of the input device to another location of the input device.

25. The computer-readable medium of claim 24, wherein the indication that the input object has moved to another location of the input device includes an indication that the input object has moved across the input device from the second location of the input device to the first location of the input device.

26. The computer-readable medium of claim 25, wherein the method performed by the computing device further includes:

responsive to receiving the indication that the input object has moved across the input device from the second location of the input device to the first location of the input device, causing the recording device to resume recording the audio signal.

27. The computer-readable medium of claim 25, wherein the indication that the input object has moved across the input device from the second location of the input device to the first location of the input device includes an indication of a slide gesture, entered by the input object, from the second location of the input device to the first location of the input device.

28. The computer-readable medium of claim 23, wherein the indication of the input object being maintained at the first location of the input device includes an indication of a hold gesture, entered by the input object, at the first location of the input device.

29. The computer-readable medium of claim 23, wherein the indication that the input object has moved across the input device from the first location of the input device to the second location of the input device includes an indication of a slide gesture, entered by the input object, from the first location of the input device to the second location of the input device.

30. The computer-readable medium of claim 23, wherein the first icon and second icon are output for presentation on the display device such that the first icon is displayed immediately adjacent to the second icon.

31. The computer-readable medium of claim 23, wherein the portion of the text to be removed from presentation on the display device is output, by the computing device, for presentation on the display device such that, as displayed, the portion of the text to be removed from presentation on the display device is visually emphasized.

32. The computer-readable medium of claim 23, wherein the input device is a presence-sensitive input device.

33. The computer-readable medium of claim 23, wherein the text that is based on the recorded audio signal and output for presentation on the display device is determined by:
   sending to a remote device, at least a portion of the recorded audio signal; and
   receiving, from the remote device, the text from the text based on the recorded audio signal.

\* \* \* \* \*